United States Patent [19]

Kurimoto et al.

[11] 3,766,011

[45] Oct. 16, 1973

[54] METHODS FOR THE SEPARATION AND PURIFICATION OF AMYLOSES

[75] Inventors: Masashi Kurimoto; Mikihiko Yoshida, both of Okayama, Japan

[73] Assignee: Hayashibara Company, Okayama-shi, Okayama, Japan

[22] Filed: July 7, 1971

[21] Appl. No.: 160,513

[30] Foreign Application Priority Data
July 13, 1970   Japan.............................. 45/61274

[52] U.S. Cl...................... 195/31 R, 127/38, 195/7
[51] Int. Cl.............................................. C12b 1/00
[58] Field of Search............................ 195/31, 7, 11

[56] References Cited
UNITED STATES PATENTS
3,632,475   1/1972   Sugimoto et al.................. 195/31 R

OTHER PUBLICATIONS

Yoshida et al., Chem. Abs. Vol. 73, No. 111,200S, 1970.

*Primary Examiner*—Lionel M. Shapiro
*Attorney*—Alvin Browdy and Sheridan Niemark

[57] ABSTRACT

Purified macromolecular amyloses are prepared by debranching the branched fraction present in starch, namely amylopectin, with the employment of alpha-1,6-glucosidases after gelatinizing the starch by heating, freezing the resultant, thawing the frozen product, heating the thawed product to a temperature lower than 70°C, eluting the low molecular amyloses, and then removing the retrograded starch thus formed in order to purify the macromolecular amyloses.

11 Claims, No Drawings

METHODS FOR THE SEPARATION AND PURIFICATION OF AMYLOSES

The invention relates to methods for the purification and separation of macromolecular amyloses comprising debranching the branched fraction present in starch, namely amylopectin, using alpha-1,6-glucosidases after gelatinizing the starch by heating, freezing the resultant, thawing the frozen product, heating the thawed product to a temperature lower than 70°C, eluting the low molecular amyloses, and then removing the retrograded starch thus formed in order to purify the macromolecular amyloses.

Every variety of starch, including sweet potato starch, potato starch, corn starch, amylomaize starch, etc., consists of linear chained molecules of amyloses and branched chain molecules of amylopectins. The amylopectin molecules of starch may be converted into linear chained molecules by hydrolyzing gelatinized solutions of starch using alpha-1,6-glucosidases which selectively debranch the alpha-1,6-glucosidic linkages that constitute the branched molecules of amylopectin. Accordingly, the hydrolyzed starch contains amyloses which were originally present in the starch material and amyloses which were formed by the hydrolysis reaction and which correspond to the branched chains of amylopectin. The former possesses a degree of polymerization (D.P.) of about 300 – 2,000 and is referred to hereinafter as macromolecular amylose. The latter consists of molecules with a degree of polymerization (D.P.) of approximately 15 – 50, which are referred to hereinafter as low molecular amylose. The content of macromolecular amylose in ordinary starches is 20 – 25 percent by weight (dry substance) whereas in amylomaize starch the content is 50 – 80 percent by weight (dry substance). The separation of macromolecular amylose from such starch materials is difficult as is commonly found in the case of high hydrophilic macromolecules Upon cooling these amylose mixtures with different D.P.s the macromolecular amyloses are retrograded and separated by precipitation. On the other hand, however, since the moisture content of the precipitate is high, approaching a level of 90 percent, the 90 percent moisture content dissolves the low molecular amylose within the mixture and thus decreases greatly the marcromolecular amylose content. Therefore the separation and purification of amyloses are not attained.

The methods known in the art are (1) precipitation and separating amylose with the addition of a salt, such as magnesium sulphate, etc., at a high concentration to the aqueous starch solution and (2) precipitating and separating amylose in the form of complexes by the addition of an alcohol, such as n-butanol, etc. Method (1) requires a large amount of salts and, moreover, the removal of the salts by washing is difficult. In the case of method (2), n-butanol should be added to a starch solution of a low concentration, and furthermore the moisture content of the precipitates is high which causes difficulty in the subsequent procedures of dehydration and removal of alcohols. In an attempt to eliminate these difficulties the inventors studied methods for the separation of amylose from aqueous starch solutions as retrograded amylose crystals with low moisture contents. The inventors succeeded in developing methods comprising cooling the aqueous starch solutions to precipitate the amylose as retrograded crystals, freezing the solutions in order to separate the large amount of water hydrated to the starch molecules in the form of ice, thawing the resultant to facilitate separation of retrograded crystals of amylose from water, and then removing easily the thawed moisture content, namely the aqueous portion of the solution, by centrifuge or filtration. Thus the spongy retrograded starch may be recovered by separation. Accordingly, the inventors discovered that a decrease of the moisture content to 60 – 70 percent was attainable.

However in this procedure the freezing procedure after cooling causes the co-existence of low molecular amyloses or amylopectin in the macromolecular amylose portion. Therefore the inventors established the fact that retrograded macromolecular amylose can be purified by a method comprising heating the thawed starch solution to a temperature not more than 70°C for a short period, that does not effect gelatination and dissolution of the retrograded and crystallized macromolecular amylose portion, simultaneous centrifuging, filtering or pressing of the resultant product to remove the amylopectin portion and low molecular amylose portion in the form of aqueous solutions and thus obtaining sufficiently purified retrograded macromolecular amyloses.

The efficiency of the process is displayed especially when a starch with a macromolecular amylose content exceeding 50 percent is used as starting material. Such starches are amylomaize starch, amylose starch separated from gelatinized starch by precipitation with the use of salts, and starches which possess high contents of macromolecular amyloses obtained by fractionation. Preferably the entire compositions of these starches may be converted into linear molecules of amyloses by the action of alpha-1,6-glucosidases following gelatination of the starches by heating, and then the resulting product may be subjected to the treatment of freezing, thawing and separating to obtain the macromolecular amyloses. However in the case of amylomaize starches, macromolecular amyloses are obtainable by the same freezing treatment with the omission of the hydrolysis effected by the employment of alpha-1,6-glucosidases. In addition, since the high amylose starch which is obtained by gelatinizing ordinary starches with heating and recovering the precipitated portion, contain a substantial amount of macro-molecular amyloses, the recovery of highly pure macromolecular amyloses is possible by similarly freezing and thawing the product.

10 percent aqueous solutions, by weight, were prepared with macromolecular amylose which possessed a D.P. higher than 50, and with low molecular amylose of lower than D.P. 50, respectively. The 10 percent solutions were cooled and frozen, thawed at 40°C, heated to 40° – 80°C and then the rates of dissolution were determined. The results showed that the heating for a duration of 10 – 60 minutes concentration of the dissolved macromolecular amyloses solution was only 1 – 2 percent by weight, however, concentration of the low molecular amyloses solution was 8 – 10 percent by weight, showing a significant difference in the rates of dissolution.

Based on the above findings the inventors studied the same procedures with corn starch, amylomaize starch, etc., gelatinizing the starches, hydrolyzing them with alpha-1,6-glucosidases, freezing, thawing, heating and centrifuging or filtering the hydrolyzates, and then determined the D.P.s of the precipitates and liquid portions of the resultant products. In the cases of starches with a natural amylose content of around 25 percent, such as corn starch, an increase in the average D.P.s of the precipitates were observed compared with those of the liquid portions, showing the effectiveness of these procedures. However since the precipitation portion which was recovered in a yield of about 60 percent against the starting material, by weight, dry substance, contains over 60 percent, by weight, of low molecular amyloses with D.P.s of less than 50, the said purpose of the invention cannot be realized sufficiently. However the efficiency of the invention can be attained with amylomaize starches possessing amylose content of 50 – 80 percent, recovering as precipitates in a yield of 60 – 80 percent against the weight of starting material. In the precipitates which possessed a moisture content of 60 – 70 percent were present 80 – 90 percent of amyloses with D.P.s of over 50. In the case of natural amylomaize starches which were not subjected to the actions of alpha-1,6-glucosidases the efficency of the invention was somewhat lower. However pure amyloses with amylose contents of about 88 percent were found obtainable.

The procedures, objects and advantages of the invention will become apparent to the practioner from the following detailed description. Any starch selected from the group comprising ordinary starches, for examples corn starch, potato starch and sweet potato starch, and specific varieties of starches, for example amylomaize starch which possesses high amylose content or amylose obtained from ordinary starches by fractionation, for example amylose starch produced by Avebe, Veendam, Holland, or mixtures of thereof may be employed as starting material. Especially since amylomaize starch contains 50 – 80 percent of natural macromolecular amylose the employment of the starch as starting material is advantageous in the production of macromolecular amylose compared with the use of ordinary starches as starting material. The fact that macromolecular amylose of high purity is obtainable in a higher yield is a natural consequence.

Gelatination may be carried out with starches with concentrations of 5 – 20 percent. The temperature for the gelatination should be in the range of 100°C – 135°C. However complete dispersion of macromolecular amyloses is not necessary, only complete dispersion of the amylopectin portion is required. Preferably, hydrolysis of macromolecular amyloses should be prevented. Therefore the starch slurry is homogeneously dispersed into gelatinized starch under stirring and heating at 100°C – 135°C. The gelatinized starch is then cooled rapidly to 50°C – 60°C and alpha-1,6-glucosidases are added. The suitable alpha-1,6-glucosidase preparations are enzymes produced by *Actionomycetes* and those produced by *Lactobacillus*. When these heat stable enzymes are employed they are added to gelatinized starch solutions of 60°C. The mixture is stirred, with the decrease of viscosity the temperature of the mixture is brought to 40°C – 50°C and then other ordinary enzymes which will be described hereinafter may be used.

Among ordinary alpha-1,6-glucosidases the one derived from *Pseudomonas amylodelamosa* B15 ATCC 21262 is most suitable, other glucosidases, isoamylases or pullulanases are also employable. The employment of 20 – 50 units of the enzyme per gram starch and the subjection for 40 – 50 hours to pH 3.5 – 6.0 is sufficient to effect the reaction almost completely. The reaction mixture is allowed to cool or is cooled gradually and thereafter frozen, whereupon the mixture is heated indirectly to about 40°C to thaw and is then heated and stirred. The suitable temperature of heating and the period of heating are about 50°C – 70°C and 20 – 60 minutes respectively. Since a temperature exceeding 80°C effects gelatination of the retrograded starch, the temperature and period should be adjusted correlatively to the ranges which facilitate the subsequent procedure of separation. By removing the eluted part of low molecular amyloses which is to be separated by centrifuging or filtering precipitates of starches with a moisture content of 60 – 70 percent are obtained. The precipitates are then suspended again in warm water, at 40°C – 50°C, or washed with water of the same temperature to remove the low D.P. portion. The wash solution and the former separated solution are put together, concentrated, cooled and the low D.P. amyloses are recovered. According to this method the recovery of macromolecular amyloses is attainable and a portion which comprises 90 percent of amyloses exceeding D.P. 50 is obtainable.

The process as described above in detail which comprises gelatination of ordinary starch, hydrolysis of the amylopectin present in the starch by the action of alpha-1,6-glucosidase to a mixture of linear chain amyloses, freezing, retrograding and thawing the mixture by heating, dissolution of the low molecular amyloses, and centrifuging is advantageous and effective in increasing the purity of macromolecular amyloses.

Similar treatment of amylomaize starch gives macromolecular amyloses of higher purity, i.e., natural macromolecular amyloses, in high yield. In addition even when amylomaize starches are used as starting material and not subjected to the actions of alpha-1,6-glucosidases, the amylopectin present in the starch may be isolated and the macromolecular amyloses may be purified by freezing and thawing the amylomaize starch and then dissolving by heating and then centrifuging the amylopectin.

Also in the freezing-retrogradation procedure retrogradation and precipitation may be facilitated by the addition of a small amount of an alcohol, such as n-butanol, or by stimulating the starch solution with a supersonic treatment.

The following examples will illustrate the further details of the method of the invention and constitute preferred embodiments thereof. All portions given in the examples are by weight unless otherwise specified.

EXAMPLE I

A 15 percent aqueous suspension was prepared with amylomaize starch containing 70 percent of amylose, and adjusted to pH 4.0 – 4.5. The suspension was gelatinized by autoclaving with stirring to 135°C which was thereafter cooled rapidly to 50°C whereupon it was hydrolyzed for 45°C – 50°C after adding 30 units of enzymes, produced by *Pseudomonas amylodelamosa* ATCC 21262, per gram starch. The hydrolyzate contained 70 percent of amylose with D.P. 100 – 1,000, the remainder being of amylose with D.P. 15 – 50. The hydrolyzate was heated to inactivate the enzyme or was cooled intact and placed in a refrigerator kept at −15°C to freeze the hydrolyzate. Thereafter the hydrolyzate was thawed with warm water, 30°C – 40°C, heated to 60°C – 65°C with agitation and then the retrograded amyloses were separated by centrifuge. The resultant was then washed once with water. Thus the macromolecular amyloses with a moisture content of 60 percent were obtained. The solid portion was 90 percent of amylose, dry substance, with D.P. exceeding 50. The separated aqueous portion contained amyloses of D.P. 15 – 50. The recovery rates of each portion in solid were 73 percent and 27 percent, respectively, dry substance.

In addition when the frozen starch solution was agitated violently after thawing, the spongy thawed starch was crushed, heated to 60°C and centrifuged, amylose with D.P. over 50 constituted 95 percent of the precipitation portion and the molecular weight distribution was found sharpened.

EXAMPLE II

A 10 percent suspension of amylomaize starch (amylose content, 50 percent dry substance) was gelatinized by autoclaving at 135°C and treated similarly by the procedure described in Example I. After thawing and stirring, the resultant was centrifuged, the precipitated portion was washed with warm water, 40°C, and a portion which contained 80 percent of amyloses with D.P. exceeding 50 was obtained in the yield of 61 percent, dry substance. After condensing the liquid portion to half of volume, the portion was cooled to less than 5°C and the precipitates were centrifuged. Thus low molecular amyloses, in which molecules of D.P. 15 – 50 predominated, were obtained in the yield of 91 percent, dry substance.

EXAMPLE III

An 8 percent aqueous suspension of amylomaize starch (amylose content, 70 percent) was heated to 125°C with stirring to gelatinize completely, and then retrograded by cooling and subsequently frozen. After 30 minutes the frozen suspension was thawed with warm water (40°C), and the spongy mass was crushed, heated to 60° – 70°C and centrifuged. The precipitates were suspended in warm water of 30° – 40°C and centrifuged again. The centrifuged precipitates were washed by showering water, 40°C, on them. The precipitated portion consisted of amylose which corresponded to 65 percent of the material starch and contained 85 percent of amylose of D.P. exceeding 50. The supernatant was condensed to half volume, cooled, frozen, dehydrated, thawed and then centrifuged.

The precipitated portion obtained from the condensed washed liquor by centrifuge consisted mainly of amylopectin fraction.

EXAMPLE IV

Corn starch was purified and prepared into a 15 percent aqueous suspension. The suspension was gelatinized by agitation and heating with raw steam, dispersed completely by heating to 130°C, whereafter the dispersion was cooled rapidly to 60°C and adjusted to pH 6.0. To the resultant was added 30 units of heat stable alpha-1,6-glucosidase derived from *Lactobacillus plantarum* ATCC 8008 per gram starch, agitated, and with the decrease of viscosity the mixture was allowed to cool to 50°C whereupon the mixture was incubated for 40 hours. The completely hydrolyzed solution was frozen in a refrigerator kept at −20°C and the formed amyloses were retrograded and crystallized sufficiently. The frozen resultant was then thawed at 40°C, heated to 55°C under agitation conditions to dissolve the low molecular amyloses and was immediately centrifuged. The obtained precipitates in a high yield with a moisture content of 60 percent retrograded starch which contained larger amounts of macromolecular amyloses than that in the reaction mixture and the low molecular amylose ratio was found decreased. However, the obtained precipitates still contained over 50 percent of low molecular amylose and separation was not found to be sufficient.

EXAMPLE V

The reaction mixture obtained in Example IV, i.e., the mixture of low- and macromolecular amyloses (containing the former 75 percent and the latter 25 percent, dry substance), was cooled and the retrograded amyloses formed at 40°C were centrifuged. Thus a crude purified product containing about 40 percent of macromolecular amylose was obtained in the yield of 57.5 percent. The moisture content of the product was 80 – 85 percent. A sample of the product was cooled and frozen to effect retrogradation of the macromolecular amyloses, then thawed, heated to 70°C and centrifuged. Thus spongy retrograded marcomolecular amyloses were obtained. The yield was as solid 22 percent based on starch used as starting material, dry substance. The product contained over 90 percent of amyloses with D.P. exceeding 50 and its purity was greatly improved.

EXAMPLE VI

A 20 percent suspension of potato starch was prepared after purifying the starch. The suspension was heated to 130°C and gelatinized, whereupon it was incubated for 40 hours to pH 4.0 and 45°C – 50°C with the addition of alpha-1,6-glucosidase produced by *Pseudomonas amylodelamosa* ATCC 21262. The reaction mixture was allowed to stand intact for a day and was then centrifuged at 45°C. The obtained precipitates possessed a moisture content of 79 percent and was obtained in a yield of 75 percent based on the starting material, dry substance. The precipitates were dissolved by heating to 60°C and then cooled gradually and subsequently frozen at −20°C. After thawing at 40°C and heating to 60°C the liquid portion of dissolved low molecular amyloses was centrifuged and then washed with warm water. The thus obtained precipitates possessed a moisture content of 60 percent and recovery rate of 25 percent, as solid, against starting material and contained 90 percent of natural macromolecular amyloses exceeding D.P. 50.

EXAMPLE VII

A 20 percent suspension of waxy corn starch was heated to 120°C under stirring condition to gelatinize and disperse, whereupon it was cooled rapidly to 50°C and enzyme of *Pseudomonas amylodelamosa* ATCC 21262 was added. The mixture was incubated for 45 hours at pH 4.0 and 45°C, cooled, frozen at −20°C, thawed the next day at 40°C, heated for 20 minutes at 70°C, stirred and then centrifuging. The product contained 5 – 10 percent of precipitates with D.P. of about 50. The method is conceived as an effective one for the purification of low molecular amyloses rather than for the production of macromolecular amyloses. The solution portion obtained by centrifuge was cooled to retrograde the product, then centrifuged, thus pure water-soluble-low-molecular-amyloses were obtained.

We claim:

1. In a process for the production of macromolecular amylose comprising gelatinizing a suspension of ordinary starch or high amylose starch by heating, cooling the gelatinized starch and hydrolyzing the amylopectin present in said solution to low molecular amylose by subjecting it to an $\alpha$-1,6-glucosidase, the improvement wherein said macromolecular amylose is purified comprising the steps of:
   gradually cooling the resultant hydrolyzed solution until the macromolecular amylose precipitates as retrograded crystals;
   freezing the cooled hydrolyzed solution;
   thawing the solidified solution at a temperature of about 30° – 'C.;
   stirring the resultant mixture at 40° – 80°C. until the low molecular amylose is dissolved; and
   separating the macromolecular amylose by centrifuging, filtering or pressing.

2. A process according to claim 1 wherein said gelatinizing step comprises heating at 100°C – 170°C.

3. A process according to claim 1 wherein said step of cooling the gelatinized starch is to a temperature of 40°C. – 60°C.

4. A process according to claim 1 wherein said freezing step is carried out at a temperature lower than –5°C.

5. A process according to claim 1 further including the steps of concentrating and drying the separated solution portions in order to produce purified low molecular amylose of high purity as a by-product.

6. A process for the separation of macromolecular amylose from starch solution comprising:
   gelatinizing a suspension of high amylose starch or amylose obtained by fractionation of starches;
   gradually cooling said gelatinized suspension until macromolecular amylose precipitates as retrograded starch;
   freezing said cooled suspension;
   thawing said suspension at about 30° – 40°C.;
   stirring the resultant mixture at 40° – 80°C. until any low molecular amylose is dissolved; and
   separating the undissolved macromolecular amylose by centrifuging, filtering or pressing.

7. A process according to claim 6 wherein said gelatinizing step comprises heating at 100°C – 135°C.

8. A process according to claim 6 wherein said freezing step is accomplished at a temperature lower than –5°C.

9. In a process for producing low molecular amylose comprising gelatinizing a suspension of waxy corn starch, cooling the gelatinized stock and hydrolyzing the amylopectin present in said solution by subjecting it to an $\alpha$-1,6-glucondase, the improvement wherein said low molecular amylose is purified comprising the steps of:
   gradually cooling the resultant hydrolyzed solution until the macromolecular amylose precipitates as retrograded crystals;
   freezing the resultant cooled solution;
   thawing the solidified solution at at temperature of about 30° – 40°C.;
   stirring the resultant mixture at 40° – 80°C. until the low molecular amylose is dissolved;
   separating the supernatant containing dissolved low-molecular amylose by centrifuging, filtering or pressing; and
   removing the low molecular amylose from said supernatant.

10. A process according to claim 1 further including the step of wishing the separated macromolecular amylose with water.

11. A process according to claim 6 further including the step of washing the separate macromolecular amylose with water.

* * * * *